United States Patent [19]

Johnson

[11] 4,341,442

[45] Jul. 27, 1982

[54] FIBER OPTICAL TRANSMISSION FILTER WITH DOUBLE-REFRACTION ELEMENT

[75] Inventor: Mark Johnson, Ossining, N.Y.

[73] Assignee: Max-Planck-Gesellschaft zur Forderung d. Wissenschaften e. V., Gottingen, Fed. Rep. of Germany

[21] Appl. No.: 124,720

[22] Filed: Feb. 26, 1980

[30] Foreign Application Priority Data

Mar. 6, 1979 [DE] Fed. Rep. of Germany ....... 2908752

[51] Int. Cl.³ ............................................. G02B 5/172
[52] U.S. Cl. .............................. 350/96.30; 350/96.15; 350/311; 350/372; 350/400
[58] Field of Search ................ 350/96.15, 96.16, 96.29, 350/96.30, 371, 372, 400, 401, 311

[56] References Cited

U.S. PATENT DOCUMENTS

| | | | |
|---|---|---|---|
| 4,247,166 | 1/1981 | Yeh | 350/400 X |
| 4,252,404 | 2/1981 | DiVita | 350/96.16 |
| 4,253,727 | 3/1981 | Jeunhomme et al. | 350/96.15 |

FOREIGN PATENT DOCUMENTS 55-22729  2/1980  Japan ................. 350/96.15

OTHER PUBLICATIONS

Evans, "Solc Birefringent Filter", *J.O.S.A.*, vol. 48, No. 3, Mar. 1958, pp. 142-145.
Simon et al., "Evolution of Polarization Along a Single-Mode Fiber", *Appl. Phys. Lett.*, vol. 31, No. 8, Oct. 1977, pp. 517-520.
Rashleigh et al., "Polarization Mode Dispersion in Single-Mode Fibers", *Optics Letters*, vol. 3, No. 2, Aug. 1978, pp. 60-62.
Ulrich et al., "Single-Mode Fiber-Optical Polarization Rotator", *Appl. Optics*, vol. 18, No. 11, Jun. 1979, pp. 1857-1861.

Primary Examiner—John D. Lee
Attorney, Agent, or Firm—Craig and Antonelli

[57] ABSTRACT

In manufacturing optical transmission filters having double-refraction elements, extreme care is usually necessary to provide the desired phase delay. To simplify the manufacturing process while still achieving accurate phase delay, a filter is provided with at least one double-refraction element comprising a single-mode optical filter mounted between polarizers. The double refraction of the optical fiber is sufficiently weak so that the $\lambda$ length within which light beams propagating with orthogonal polarization states in the fiber are mutually delayed by $2\pi$, is at least 1 cm. In one embodiment, the optical fiber comprises alternating sections which produce linear double refraction with sections which produce elliptical double refraction.

18 Claims, 13 Drawing Figures

FIBER OPTICAL TRANSMISSION FILTER WITH DOUBLE-REFRACTION ELEMENT

FIELD OF THE INVENTION

The invention relates generally to an optical transmission filter and, more particularly, to an optical transmission filter containing a double-refraction element.

BACKGROUND OF THE INVENTION

Double-refraction optical transmission filters can consist of a double-refraction crystal plate arranged between two parallel linear polarizers. In such an arrangement the filter possesses the characteristic feature that the first polarizer in the direction of propagation of the light determines the polarization state with which the light of a wide-spectrum beam impinges upon the crystal. Because of the double refraction, which can be assumed generally without limitation to be a linear double refraction, the light beam is split into two beams polarized orthogonally and propagating at different velocities in the crystal. The light beam which issues from the crystal, and which results from the superposition of the two partial beams, exhibits generally elliptical polarization. The second polarizer, on the output side, is transparent only to the light beam component which is parallel to its plane of polarization and its transmission varies sinusoidally with the phase delay applied to one partial beam relative to the other because of the crystal double refraction. Since—without consideration of the variation in the effective index of refraction determined by the crystal material dispersion—said delay is approximately in inverse proportion to the wavelength of the incident light, the transmission is sinusoidally dependent on the inverse wavelength.

For a given wavelength $\lambda$ of the light injected into the double-refraction crystal with a defined linear polarization state, the transmission is maximum in such a filter when the relative phase shift is $2\pi$ or an integral multiple $p$ of $2\pi$, determined by the difference in the two optical distances travelled by the two orthogonal polarization states. This can be written as the equation:

$$\frac{d\Delta n}{\lambda} = p \tag{1}$$

where p is the order in which the filter is operated at given wavelength $\lambda$.

This condition is met also for proximate wavelengths $\lambda_1 = \lambda + \Delta\lambda_1$ and $\lambda_2 = \lambda - \Delta\lambda_2$ when:

$$\frac{d\Delta n}{\lambda \pm \Delta\lambda_{1,2}} = p \mp 1 \tag{2}$$

The wavelength intervals $\Delta\lambda_{1,2}$ for the transmission maxima of the filter transmission maximum for wavelength $\lambda$ is then given by the equation:

$$\Delta\lambda_{1,2} = \frac{\lambda}{p \mp 1} \tag{3}$$

It is apparent that a given minimum distance $\Delta\lambda$ between the transmission maxima of such a filter can be maintained only when the order in which the filter is operated is not larger than a maximum $p_{max}$ obtained from equation (3) for wavelength interval $\Delta\lambda_1$ of the "longer" wavelength when this equation is solved according to p:

$$p_{max} = \frac{\lambda + \Delta\lambda}{\Delta\lambda} \tag{4}$$

This means that such a transmission filter, which for a wavelength $\lambda$ of 480 nm is to have an interval $\Delta\lambda$ of about 20 nm between transmission maxima, must be operated with a maximum order of p=25.

From equation (1) it follows directly that a calcite plate ($\Delta n$=about 0.16) with plane-parallel surfaces mounted as a double-refraction element in a transmission filter operated at a wavelength $\lambda = 500$ nm with order 25, must present a thickness d of about 0.081 mm. For a satisfactory filter operation accuracy of about 1/100 of $\lambda$, thickness $d_\lambda$ within which a phase delay $2\pi$ occurs between the two orthogonal polarization states, is required, i.e. 30 nm or 1/17 of the wavelength. Therefore, the crystal plate must be processed with high accuracy, which naturally entails very high manufacturing costs for the filter. This is true also when, instead of a calcite plate, a quartz plate is used as a double-refraction element in which the difference $\Delta n$ between the indices of refraction applicable to the two orthogonal polarization states is about 0.01. In this case the $\lambda$ thickness is about 50,000 nm, and the tolerance acceptable for the quartz-plate thickness is about 500 nm, which is thus on the order of magnitude of the wavelength of the light to be filtered.

This disadvantage in the difficult and expensive production of such crystal plates applies particularly to filter arrangements in which a plurality of crystal plates are mounted in succession as a stack along the beam path. The first multilayer arrangement of this type was a filter proposed by Lyot (B. Lyot, Ann. Astrophys. 1944:7(1), 2). The Lyot filter comprises, for example, N plates stacked successively in the direction of light propagation, each plate being used with double the thickness of the preceding plates. Each plate is mounted with the polarizers crossed at a right angle. The optical axes of the double-refraction delay plates extend at 45° to the planes of polarization defined by the polarizers. The resulting transmission presents very definite transmission maxima with a stop-band which is determined by the plates of least thickness, and whose bandwidth decreases as the number of plates increases. Weakly marked secondary maxima also exist between the primary maxima. The transmission bandwidth obtainable with a Lyot filter comprising up to 10 plates is typically 5 to 0.5 Å.

Similar narrow bandwidths are obtained with the multilayer double-refraction transmission filter suggested by Solc (I. Solc, Czechoslov. Cosopis pro Fysiku 1953:3, 336; 1954:4, 607, 609; 1955:5, 114). In a structure roughly equivalent to that of a Lyot filter with N plates, the Solc filter comprises, for example, m plates of equal thickness d equal to the thickness of the thinnest plates of the Lyot filter. The entire stack of plates is arranged between only two polarizers. The optical axes of the individual crystal plates are parallel to the plate surfaces and perpendicular to the direction of light propagation. In a first embodiment of the Solc filter the optical axes of the individual crystal plates are shifted fanlike by an angle $$\omega_j = (\xi/2) + (j-1)\xi \tag{5}$$

with $$\xi = \pi/2m \quad (6)$$

where m is the number of plates of equal thickness. The polarizers are parallel.

In a second equivalent embodiment the directions of the optical axes alternate successively at an angle $$\omega_j = (-1)^{j+1}(\xi/2) \quad (7)$$

where equation (6) applies to $\xi$. The polarizers between which the stack of plates is arranged are crossed.

A further description of other properties of the Lyot filter and the Solc fan and folded filters can be found in a comparative description by John W. Evans (Journal of the Optical Society of America, Vol. 48, No. 3, March 1958, pp. 142ff.).

It is apparent that, because of the multiplicity of necessary crystal plates which must be processed with the above-cited accuracy, and the need to maintain exactly the orientation of the crystal-plate optical axes, the production of both the Lyot filter and the Solc filter is extremely complicated and expensive. Therefore, it is very difficult to tune such filters.

SUMMARY OF THE INVENTION

Accordingly, an object of the present invention is to provide filters of the above-cited type, but which are considerably simpler and cheaper to manufacture, and which users experienced with optical apparatus can adjust to the appropriate transmission range.

To achieve this and other objects, the present invention provides an optical transmission filter having at least one double-refraction element mounted between polarizers determining characteristic polarization states. The dimension of the double-refraction element, viewed in the direction of the light path, is sufficient to obtain a phase delay of at least $2\pi$ between orthogonal polarization states for at least one wavelength of the injected light. In particular, the double-refraction element is a single-mode optical fiber whose double refraction is sufficiently weak so that the length within which the light beams propagating with orthogonal polarization states in the fiber are mutually delayed by $2\pi$ is at least 1 cm.

In comparison to known filters comprising one or more double-refraction crystal plates the present invention provides for the advantage that the use of weakly double refractive optical fibers in which the minimum value of the λ length-comparable thickness of the crystal material used in known double-refraction filters is about 1 cm presents no special difficulty in observing a range advantageous to the processing of such fibers to transmission filters, and especially the tolerance of about 1/100 of the λ length required for the fiber length. There is also no difficulty in obtaining exactly the necessary fiber length of 1/10 mm by cutting the fiber to the required length or breaking off the fiber at designated break points by scratching the fiber surface to obtain in the fiber core a break surface extending with a very good approximation at a right angle to the fiber longitudinal axis. In a single-mode fiber core, diameters relatively small in comparison to the outer diameter are especially advantageous, so that even when the break surfaces are not exactly plane parallel, the resulting surface curvatures in the fiber core are negligible, which is necessary to avoid distorting the shape of the light beam. An optical fiber of the required length needs no subsequent processing before use in a double-refraction filter.

According to the present invention, the manufacture of narrow-band, fiber-optics transmission fibers similar to multilayer crystal filters is considerably simplified, so that they can be mass produced at low cost. This is significant in respect to the use of such filters is fiber-optics multiplex information transmission systems requiring a plurality of such filters.

The filter of the invention can also provide for manufacture-conditioned double refraction, inherent linear double refraction induced by pinching or bending the fiber, circular double refraction caused by fiber torsion, and elliptical double refraction resulting from the combination of linear and circular double refraction.

The present invention can also provide for fiber-optics transmission filters similar to the Solc fan filter by the combined utilization of inherent linear double refraction in a single-piece fiber extending between parallel polarizers, and elliptical double refraction obtained by twisting a portion of the fiber.

Further, the present invention can apply to fiber-optics transmission filters similar to the Solc fan and folded filters, with the necessary linear double refraction for such filters being obtained by pinching the fiber in suitable directions. Such filters in which the double refraction results from pinching the optical fiber offer the advantage of continuous adjustment by varying the pinching force in effect per length unit.

The present invention can also apply to produce filters similar to Solc fan and folded crystal filters. In this case, the double refraction required for filtering is obtained by bending the single-mode fiber in the form of loops placed so that the overall size of the filter is advantageously small and determined substantially by the diameter of the loops.

The fiber-optics transmission filter of the present invention, or a plurality of such filters, tuned to discrete wavelengths, is ideally applicable to fiber-optics transmission systems to separate the light signals transmitted from several semiconductor lasers and injected into a single-mode optical transmission fiber, thereby fully utilizing the highest possible information-transmission capacity in an optical communications transmission system.

BRIEF DESCRIPTION OF THE INVENTION

Other details and features of the present invention appear in the following description of embodiments in reference to the drawings, wherein.

DETAILED DESCRIPTION OF THE PREFERRED EMBODIMENTS

Figure 1:
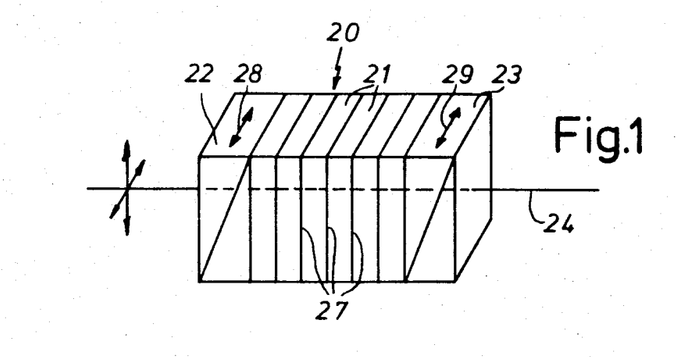
FIG. 1 shows a Solc filter consisting of m double-refraction crystal plates.

Turning now to the drawings, FIG. 1 schematically represents a Solc filter 20 consisting of m double-refraction crystal plates 21 and two linear polarizers 22 and 23 which will be discussed for providing further background of the present invention. About 1/100 of the above-defined thickness λ-thickness $d_\lambda$ of the crystal plates 21, characteristic of the light transmitted through the filter 20 at a determined wavelength, is the required tolerance. In the arrangement shown in FIG. 1 the crystal plates 21 are set up in a stack extending in the longitudinal direction of the central axis 24 of the light beam passing through the filter 20 between input polarizer 22 and output polarizer 23, with the facing plane parallel faces 27 in mutual contact and at a right angle to said axis 24. The optical axes (indicated by arrows 26 in FIG. 2) of the double-refraction crystals forming plates 21 are parallel to contacting plate faces 27.

Figure 2:
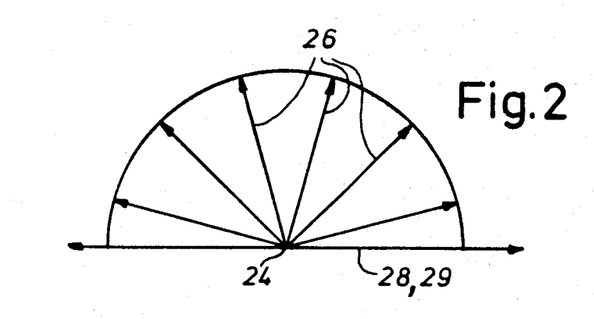
FIG. 2 shows the angular distribution of the optical axes of the crystal plates in a Solc fan filter.

In the embodiment designated as a Solc fan filter, the two polarizers 22 and 23 denote the horizonal direction of polarization marked in FIG. 1 by double arrows 28 and 29, and the optical axes 26 along which there is no double refraction in crystal plates 21 are arranged fanwise around central axis 24 in the arrangement of FIG. 2, according to the above equation (5). The angle formed by optical axes 26 with the direction 28 of polarization determined by input polarizer 22, seen in the direction of light path 24, increases by the same amount $\xi = \pi/2\,m$ from plate to plate. For white, unpolarized light entering the plate stack through input polarizer 22, the filter 20 provides for transmission which is dependent on the wavelength and whose qualitative variation is illustrated by the lower transmission curve 31 in FIG. 3. The relative transmission T, normalized to 1, is plotted against the wavelength λ.

Figure 3:
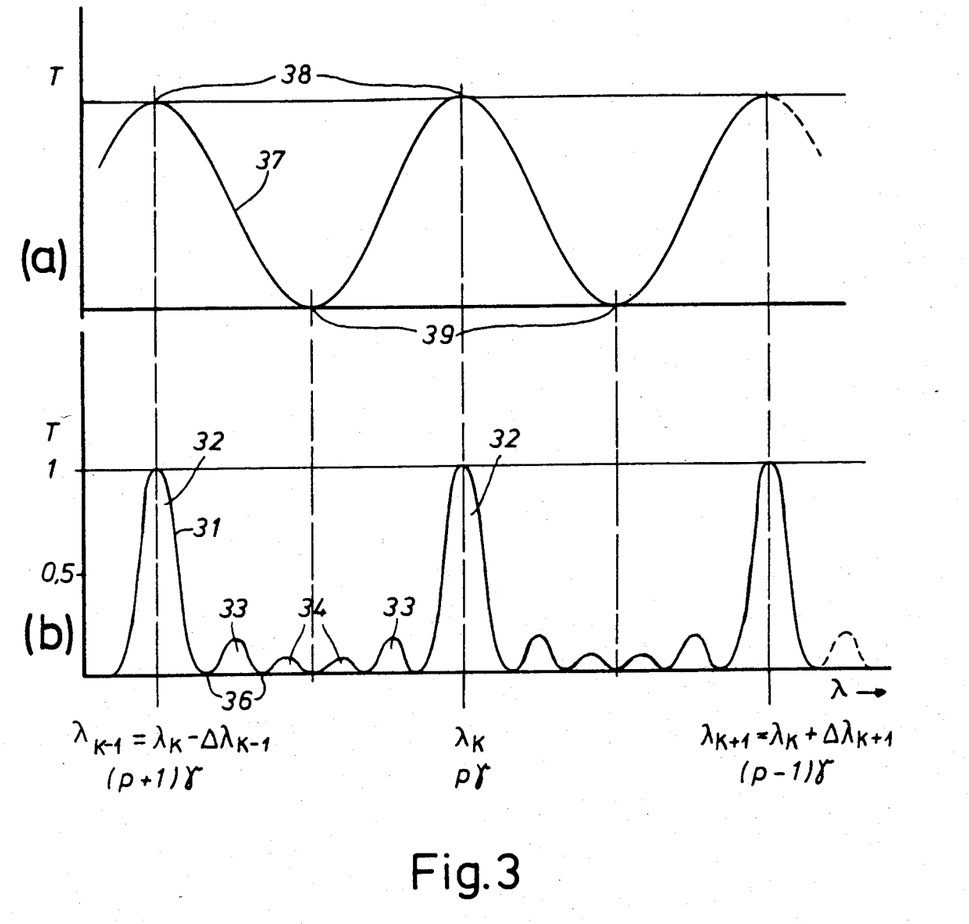
FIG. 3 shows the transmission curves illustrating a Solc filter.

As shown in FIG. 3, transmission T for the filter 20 of FIG. 1 exhibits strongly marked, narrow-band primary maxima 32 with transmission T=1 at the wavelength $\lambda_k$ for which equation (1) is fulfilled with the p integral, and whose interval on the wavelength scale is given by equations (3) and (2). Between the maxima 32, considerably less marked secondary maxima 33 and 34 appear at approximately equidistant intervals on the wavelength scale and are separated from each other and from primary maxima 32 by intermediate passages through zero 36 of transmission T.

The relative transmission of the filter 20 of FIG. 1 is represented generally by the following equation:

$$T = \left[ \frac{\sin m\chi}{\sin \chi} \cdot \cos\chi \cdot \tan\xi \right]^2 \qquad (8)$$

where the values χ are given by the expression $$\chi = \arccos[\cos\gamma \cos\xi] \qquad (9)$$

and ξ by equation (6), and $$\gamma = \pi \cdot p = \frac{\pi d \Delta n}{\lambda} \qquad (10)$$

designates the half delay of the double-refraction crystal plates 21, d and Δn being as defined above.

FIG. 3 also shows a transmission curve 37 of substantially sinusoidal form which would be produced by a single crystal plate 21 instead of m crystal plates 21 between polarizers 22 and 23. It is apparent that in this case the transmission maxima 38 of said transmission curve 37 are separated by the same wavelength intervals as the primary maxima 32 of transmission curve 31 associated with multilayer Solc filters 20, but the bandwidth is much broader and corresponds approximately to the wavelength interval between transmission maxima 38, measured between the passages through zero 39 of transmission curve 37.

Figure 4:
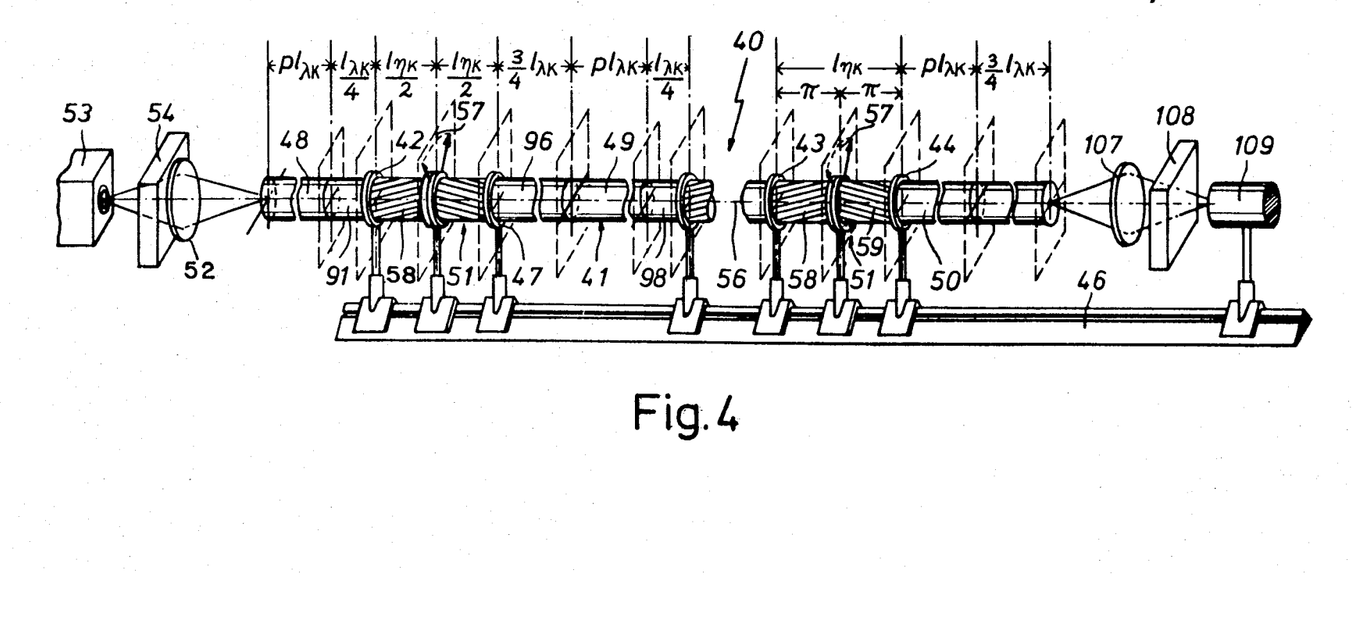
FIG. 4 represents a filter consisting of sectionally twisted optical fibers according to the present invention.

FIG. 4 represents a first embodiment of a fiber-optics transmission filter 40 of the present invention, with properties which are similar to those of the known Solc filter 20 of FIG. 1. The above equations are also applicable.

The central component of the fiber-optic transmission filter 40 is a quartz-glass, solid-core fiber 41 producing a linear double refraction of for example 100 rad/m. Optical fiber 41 is a single-mode fiber in which light can propagate only in two mutually orthogonal polarization states, which is the case when $2\pi d/\lambda(n_k^2 - n_M^2)^{\frac{1}{2}} < 2.4$, where $n_k$ is the fiber core index of refraction and $n_M$ the fiber surface index of refraction. Preferably optical fiber 41 is a weakly guiding, single-mode fiber in which the difference between indices of refraction $n_k$ and $n_M$ is only about 0.5%. The fiber core diameter is about 5 μm and the outer diameter about 100 μm. Optical fiber 41 follows a straight line when extended, and is fixed against torsion at a number of clamping points 42, 43, and 44. The holding means necessary for this purpose are symbolized in FIG. 4 by retaining rings 47 attachable at definite intervals to an optical bench. But, of course, in practical cases the structure of these retaining means may be in other suitable forms to fix optical fiber 41 at intervals which will be specified below.

Clamping points 42, 43, and 44 divide optical fiber 41 into m delay sections 48, 49, and 50 and (m−1) coupling sections 51 between said delay sections 48, 49, and 50. The function of delay sections 48, 49, and 50 is similar to that of crystal plates 20 in Solc filter 20, and the function of coupling sections 51 is to connect the delay sections in the same distribution as shown in FIG. 2 in directions comparable to those of optical axes 26 of crystal plates 21, without the need of cutting the fibers into separate pieces.

Delay sections 49, arranged between pairs of coupling sections 51, are of equal length, which, for the given wavelength $\lambda_k$ corresponding to a transmission maximum of filter 40, is equal to (p+1) times the $\lambda$ length $l_{\lambda k}$ comparable to the $\lambda$ thickness $d_\lambda$ of crystal plates 21, which is supplied by the equation:

$$l_{\lambda k} = (\lambda_k/\Delta n) \tag{11}$$

where $\Delta n$ is the difference between the indices of refraction in effect for the two orthogonal polarization states possible in the filter, and on the order of magnitude of $10^{-5}$.

The length of first delay section 48 into which white light emitted by a light source 53, received by a focusing optical system 52, and injected with a linear polarization state determines by the position of a linear polarizer 54, is then equal to $(p+\frac{1}{4})$ times the $\lambda$ length $l_{\lambda k}$. The length of the last delay section 50 must be $(p+\frac{3}{4})$ times the $\lambda$ length. The coupling sections 51 are of equal length. A suitable length for the coupling sections 51 will be discussed below. A tolerance of about $(l_{\lambda k}/100)$ is acceptable for fiber sections 48-50.

Coupling sections 51 are imparted with elliptical double refraction by twisting the fiber midway between clamping points 42 by a determined angle, symmetrically to a transverse axial plane 57 extending at a right angle to the longitudinal axis 56 of optical fibers 51. Said elliptical double refraction results from the fiber inherent linear double refraction $\beta$ and a circular double refraction $\vec{a}$ determined by torsion. Viewed in the direction of the light beam, the first portions 58 of coupling sections 51 exhibit a left elliptical double refraction, while the next portions 59 thereof exhibit a right elliptical double refraction. The effect of this complementary elliptical double refraction in coupling sections 51 and the $(l_{\lambda k})/(4)$ "extra length" of first delay section 48, the total $2l_{\lambda k}$ of the extra lengths of delay section 49, and the $\frac{3}{4} l_{\lambda k}$ of the polarization state of the light of wavelength $\lambda_k$ propagating in optical fiber 41, is explained below in reference to FIGS. 5 and 6.

Figure 5:
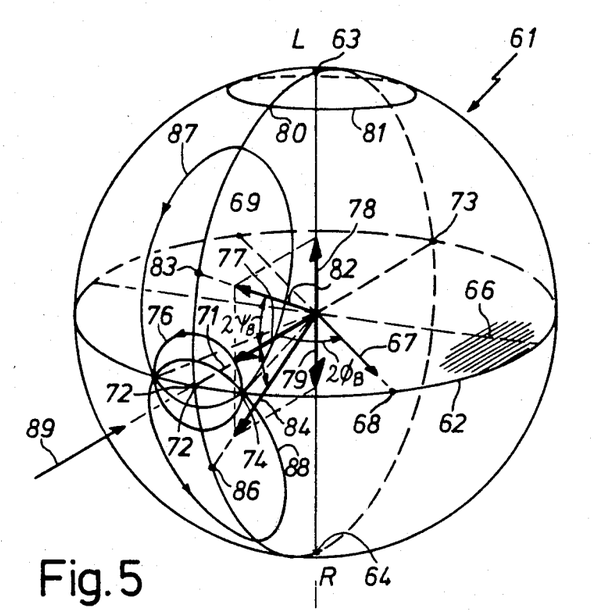
FIG. 5 represents a Poincaré sphere illustrating the operation of the filter.

FIG. 5 represents a Poincaré sphere 61 showing the possible linear polarization states by points located on the equator 62, the two possible circular polarization states (left circular polarization L and right circular polarization R) by the north pole 63 and the south pole 64, and the also possible left or right elliptical polarization states by other points on the surface of the sphere, above or below equator 62.

One linear double refraction present in optical fiber 41 is represented by a vector 67 located in the equatorial plane 66 and whose direction is indicated by the linear initial polarization state represented by points 68 and 69, whose introduction into optical fiber 41 along its length would not result in a change in the polarization state of the injected light. The direction $2\phi_B$ originates from the axes 71 associated as inherent polarization states represented by points 72 and 73 with the horizontal or vertical polarization of the incident light. If optical fiber 41 is oriented so that its optical axes are 72 and 73 and if light of a different linear polarization state represented, for example, by point 74, is injected into optical fiber 41, the polarization states occurring successively along fiber 41 progress possibly several times along a circle 76 extending around inherent polarization state 72, at an angular velocity $\beta$ whose magnitude depends on the value of the linear double refraction represented by a vector 77 oriented toward point 72.

In FIG. 5 it is assumed that the progress along circle 76 occurs counterclockwise. A circular double refraction $\vec{a}$ impressed on an optical fiber 41, for example by twisting about its longitudinal axis, or which may be an inherent double refraction, is represented in the drawing of Poincaré sphere 61 as a vector 78 or 79 oriented in the direction of polar axis 63 or 64. Vector 78, oriented toward north pole 63, indicates a left circular double refraction, and vector 79, oriented toward south pole 64, a right circular double refraction whose value is indicated in each case by the length of the vector. When a circular double refraction $\alpha$ is obtained by twisting the fiber with a determined degree of torsion $\pi$ measured in rad/m, the value of the length of vectors 78 and 79 is given by the equation:

$$|\vec{\alpha}| = |\alpha_\tau - 2\tau| \tag{12}$$

where $$\alpha_\tau = g \cdot \tau \tag{13}$$

in which g is a constant factor ranging between 0.13 and 0.16 for normal quartz fibers.

When an optical fiber exhibits only pure circular double refraction and light in any polarization state is injected into said fiber, for example, with elliptical polarization by a point 80 of Poincare sphere 61, the polarization states occurring along the optical fiber are located on a circle 81 parallel to equator 62 and progress along said circle at an angular velocity determined by the value of vector 78.

If optical fiber 41 exhibits intrinsic linear double refraction represented for example by vector 77, and if, additionally, circular double refraction is impressed thereon by suitable torsion represented by vector 78, then generally fiber 41 exhibits elliptical double refraction resulting in FIG. 5 from the addition of vectors 77 and 78 to a resultant vector 82 which corresponds on the sphere surface to an induced polarization state 83.

If, instead of the left circular double refraction represented by vector 78, an equal right circular double refraction is impressed by vector 79 on fiber 41, in combination with the linear inherent double refraction represented by vector 77, the result is an elliptical double refraction represented by a vector 84 and the induced polarization state at a point 86 of sphere 61, said point being symmetrical to induced polarization state 83 relative to equatorial plane 66.

If light of, for example, linear polarization state 74 is injected into fiber 41, the polarization states occurring along said fiber 41 are located in one case on a circle 87 concentric to the polarization state 83, and, in the other case, on a circle 88 concentric to polarization state 86. In the selected special case said circles 87 and 88 are covered counterclockwise at the same angular velocity indicated by the value of vectors 82 and 84.

The length of the portions 58 and 59 of coupling sections 51 subjected to torsion-induced elliptical double refraction $\eta$ is determined as one half of $\lambda$ length $l_{\eta k}$ applicable to the elliptical double refraction assumed to be given and which is shorter than the $\lambda$ length $l_\lambda$ in delay sections 48, 49, and 50 of fiber 41, where only linear double refraction $\beta$ is present. Considering equations 12 and 13, with a given degree of torsion $\tau$ and a given linear double refraction $\beta$ the ratio $l_{\lambda k}/l_{\eta k}$ of these $\lambda$ lengths is given by the equation:

$$I_{\eta k}/I_{\lambda k} = \frac{1}{\sqrt{\frac{1.87^2 \tau^2}{\beta^2} + 1}} \qquad (14)$$

when g=0.13. Then the linear polarization state along portions 58 and 59 varies along a $\pi$ arc of circles 87 and 88 extending around inherent polarization states 83 and 84.

Figure 6:
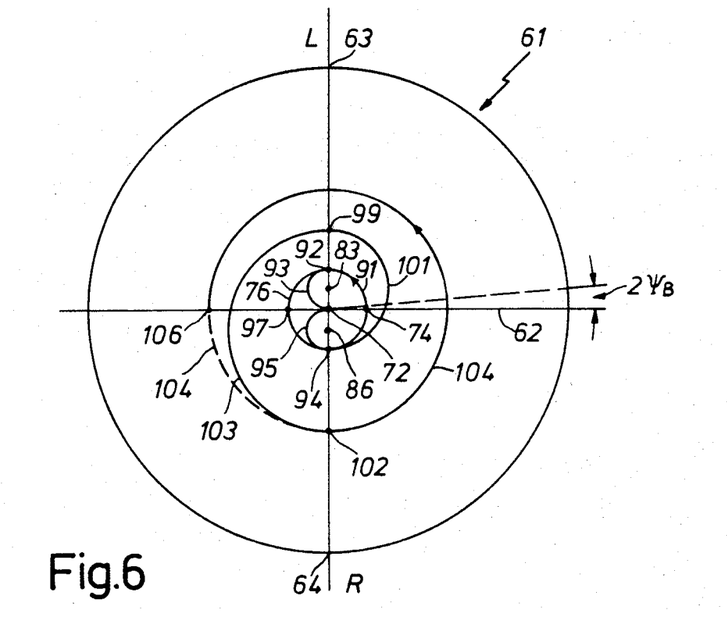
FIG. 6 is a view of the Poincaré sphere in the direction of arrow 89 in FIG. 5.

Further to clarify the operation of filter 40 of FIG. 4, reference is made to FIG. 6, which is a view of Poincaré sphere 61 seen in the direction of arrow 89. Without limiting the general concept it is assumed that the intrinsic double refraction of first delay section 48 is the horizontal state 72, and that the azimuth $2\phi_B$ of a polarization 74 injected into the first delay section is double the ellipticity $+2\Psi_B$ of the two elliptical inherent polarization states 83 and 86 of about 4°. Then the polarization state develops as follows along optical fiber 41. Light of wavelength $\lambda_k$, injected with polarization state 74 into optical fiber 41, after covering a distance p·$l_{\lambda k}$ in first delay section 48, exhibits again the same polarization state 74 determined by input polarizer 54, after covering circle 76 p times along this distance. In the rest of length $l_{\lambda k}/4$ to first clamping point 42 followed by first coupling section 51 extending to an end section 91, the polarization changes from linear polarization state 74 to polarization state 92 located on the great circle passing through poles 63 and 64. In the following first portion 58 of first coupling section 51, in which fiber 41 imparts left elliptical double refraction with inherent polarization state 83, the light polarization changes from elliptical polarization state 92 along a semicircle 93 with angular radius $2\Psi_B$ to polarization state 72 which is a horizontal polarization in the special example. In the following section portion 59 of first coupling section 51 the polarization changes from linear polarization state 72 along second semicircle 95 with an angular radius $2\Psi_B$ on unit sphere 61 to a right elliptical polarization state 94 located under equatorial plane 66 and extending to the second clamping point 42 of first coupling section 51. In the initial section 96 of length $\frac{3}{4}l_{\lambda k}$ following said clamping point 42 and second delay section 49 the polarization of the light passing through optical fiber 41 changes again from right elliptical polarization state 94 along circle 76 which extends concentrically around polarization state 72 to a linear polarization state 97 located in the left hemisphere of the Poincaré sphere 61 in FIG. 6, and from which the polarization state 72 introduced into optical fiber 41 has an azimuth $4\Psi_B = 2\phi_B$. After the additional length p·$l_{\lambda k}$ of second delay section 49, the same polarization state 97 is obtained again after p cycles along circle 76. In the following end section 98 of length $l_{\lambda k}/4$, extending to the next clamping point 42, the polarization changes from state 97 to right elliptical polarization state 94 along circle 76. In the first portion 58 of the next coupling section 51 optical fiber 41 exhibits again the same left elliptical double refraction as in the first portion of the first coupling section, and the polarization changes from right elliptical polarization state 94, and a left elliptical polarization state 99 develops in the middle of the second coupling section 51 along a semicircle 101 extending on the surface of Poincaré sphere 61 concentrically to left elliptical inherent polarization state 83 and having an angular radius $6\Psi_B$ or $3\phi_B$.

In the following second portion 59 of second coupling section 51 the light polarization changes from left elliptical polarization state 99 to a right elliptical state 102 along a semicircle 103 concentric to the directional axis of the vector of right elliptical inherent polarization state, and has an angular radius of $10\Psi_B$. From this right elliptical state 102 the polarization changes in the following, third delay section whose length is equal to that of the second in the initial section 96 of length $\frac{3}{4}l_{\lambda k}$ along a $\frac{3}{4}$ circle 104 concentric to horizontal inherent polarization state 72, to a linear polarization state 106 which has again moved the further azimuthal distance $8\Psi_B$ or $4\phi_B$ as the polarization state 97 reached at the corresponding point of the preceding delay section.

In the next portion of length p$l_{\lambda k}$ of the third delay section 50 the polarization changes along a complete circle 104 covered counterclockwise p times. The variation in the polarization state along the next delay section 49 occurs exactly as explained above, and only the radius of the circles concentric to elliptic polarization states 83 and 86 and linear polarization state 72 varies in the manner illustrated in FIG. 6, to which reference is made for the details. This last delay section 50 is shorter by $l_{\lambda k}/4$ than the preceding delay section 49, so that the light decoupled at the end of the fiber by a collimator lens 107, an output polarizer 108 similar to polarizer 23 in FIG. 1, and a suitable photoelectric detector 109, exhibits a linear polarization state.

The azimuthal distances between linear polarization states 74, 97, 106, etc., in effect at the end of each delay section are $8\Psi_B$ or $4\phi_B$. Therefore, the effect of coupling section 51 of elliptical double refraction induced by twisting between delay sections 48, 49, and 50, is totally identical to that of the fanlike orientation of the optical axes 26 of individual crystal plates 21 in the Solc filter of FIG. 1 when the azimuthal distance between the linear polarization states in effect at the outputs of the individual delay sections is adjusted by appropriate setting of the degree of torsion $\tau$ according to equations (5) and (6). As directly apparent from FIG. 5, $2\Psi_B$ is determined by the equation:

$$2\Psi_B = \tan^{-1}\left(\frac{\alpha_T - 2\tau}{\beta}\right) \qquad (15)$$

or, in consideration of equation (13)

$$2\Psi_B = \tan^{-1}\left(\frac{-1.87\tau}{\beta}\right) \qquad (16)$$

for g=0.13. The value $2\pi/m$ of said azimuthal distance to be set according to equation (6) must be equal to 4 times the value of the angle indicated by equation (16), so that:

$$\xi = \pi/2m = 8\Psi_B = 4\tan^{-1}(-1.87\tau/\beta) \qquad (17)$$

$$\frac{\tau}{\beta} = \frac{-1}{1.87} \cdot \tan\left(\frac{\pi}{8m}\right)$$

The length of coupling section 51 is then established according to equation (14) by the degree of torsion as in equation (17).

Figure 7:
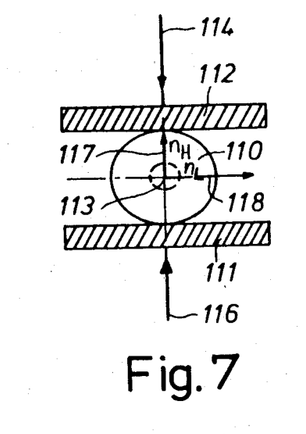
FIG. 7 shows a solid-core optical fiber pinched between two parallel compression jaws to produce linear double refraction in accordance with the present invention.

A linear double refraction with the orientation required for a filter effect of the type of a Solc fan or folded filter according to equation (5) or (7) can also be impressed on an optical fiber 110 by pinching and/or bending. When the fiber is pinched between jaws 111 and 112 as shown in FIG. 7 with a force applied at a right angle to its longitudinal axis 113 as symbolized by opposite-direction arrows 114 and 116 in FIG. 7, optical axes 117 and 118, along which the fiber exhibits the greatest or the least index of refraction, extend in the direction 114, 116 of the applied pinching force and at a right angle thereto. In the case of a fiber 110 of 100 μm diameter the pinching force necessary to obtain a double refraction of about $2\pi/m$ is about 1 N. This force may be localised or distributed along a greater length of the opposite surface lines of the fiber.

Figure 8:
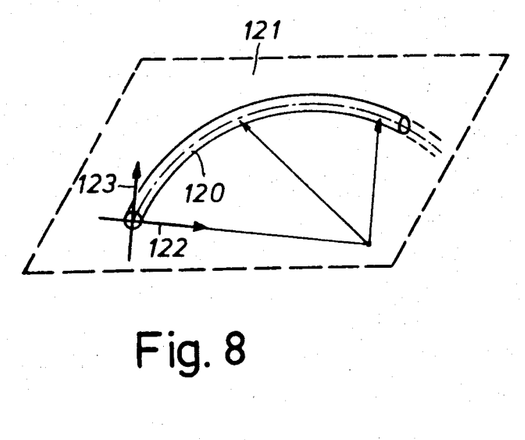
FIG. 8 shows an optical fiber bent to produce linear double refraction in accordance with the present invention.

When, for example, an optical fiber 120 is curved, especially in the form of a loop as shown in FIG. 8, and laid in one plane 121, two axes 122 and 123, corresponding to the extreme values of the effective index of refraction, are present. Axis 122, associated with the maximum value of the index of refraction, extends in the radial direction of the effective radius of curvature, and axis 123, associated with the minimum value of the index of refraction, is perpendicular to the plane of curvature 121. The value of the linear double refraction resulting from the flexure of fiber 120 depends on the fiber radius of curvature, and can therefore be adjusted by a suitable choice of the radius.

Figure 9:
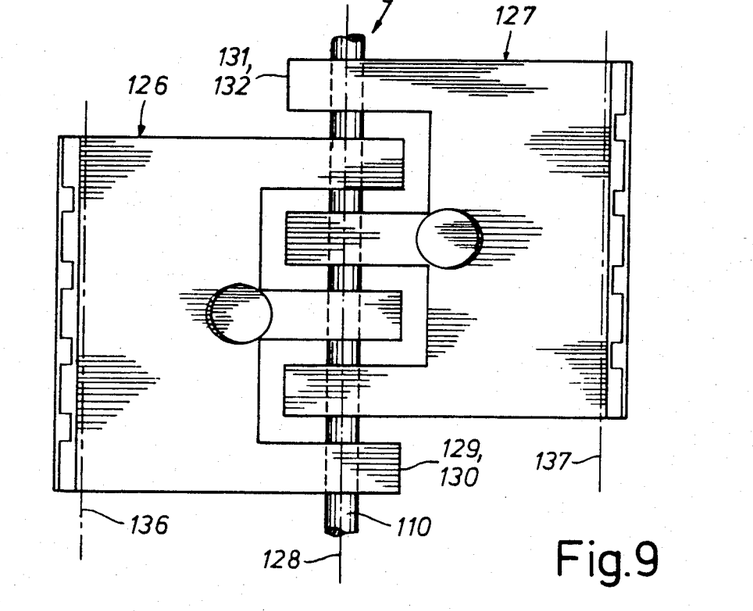
FIG. 9 shows a pinching device used to produce specific, oriented linear double refraction in the successive sections of an optical fiber in accordance with the present invention.
Figure 10:
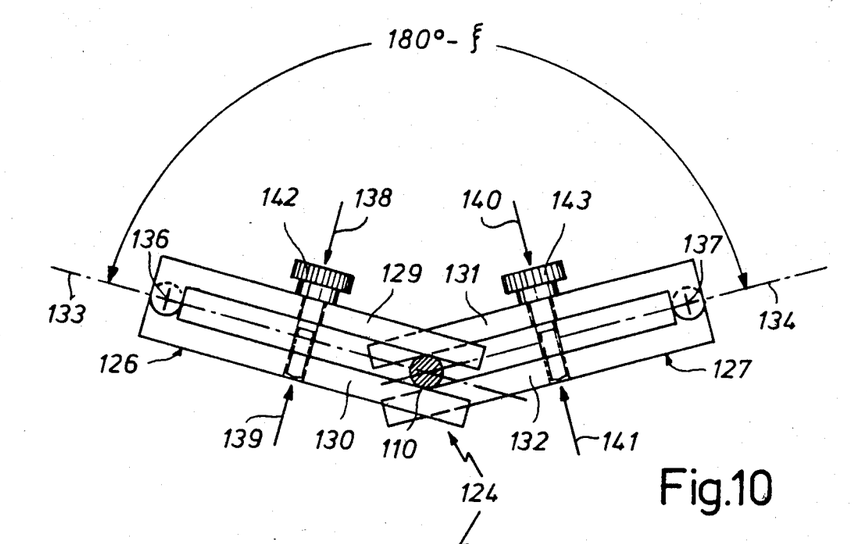
FIG. 10 is a view of the pinching device in the direction of the longitudinal axis of the optical fiber in accordance with the present invention.

In solid-core fibers, the linear double refraction is approximately proportional to the square of the reciprocal radius of curvature. In addition, it also depends on the diameter of the fiber itself. A double refraction of about $4\pi$/loop is obtained in a quartz-glass fiber laid in closed circular loops of about 10 cm diameter when the fiber diameter is approximately 100 μm. FIGS. 9 and 10 show the basic structure of a pinching device 124 and the successive, equal-length sections of an optical fiber 110 exhibiting equal amounts of linear double refraction. The device is capable of imparting the orientation of double-refraction axes 117 and 118 necessary to obtain a fiber-optics Solc folded filter according to equation (6).

Pinching device 124 comprises two pinchers 126 and 127 shown in plan view in FIG. 9 and in a view in the direction of the longitudinal axis 128 of optical fiber 110 in FIG. 10. The details of said device require no specific explanation. Pinchers 126 and 127 can be placed from opposite sides on straight optical fiber 110, so that the pair of pinching jaws 129, 130 of pincher 126 and the pair of pinching jaws 131, 132 of the other pincher 127 alternately engage optical fiber 110, as viewed in the longitudinal direction of said fiber. The median planes 133 and 134 of the pincher gap, evidenced by the central axis 128 of the optical fiber and the pivot axes 136 and 137 of the jaws 129–132 of the two pinchers 126 and 127, enclose an angle of $180° - \xi$, where $\xi$ is applied by equation (6), i.e. amounts to 15° in the illustrated embodiment comprising a total of 6 alternating pairs of pinching jaws 129, 130 and 131, 132. The pinching forces applied in the direction of arrows 138, 139 and 140, 141 are defined for example by tension screws 142 and 143 engaging jaws 126 and 127. It is apparent that the pinching device and the adjustment and orientation of the pinching forces applied to optical fiber 110 can also be provided by other equivalent means.

Figure 11:
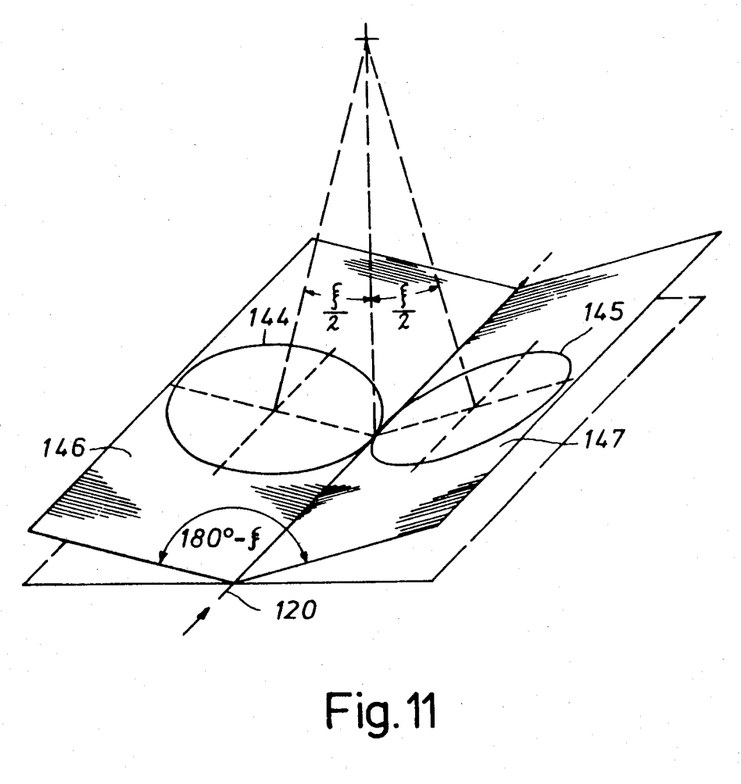
FIG. 11 shows a looped optical fiber used to obtain a Solc folded fiber in accordance with the present invention.

A similar arrangement for the production of a fiber-optics Solc folded filter is represented in FIG. 11. The double refraction necessary to the filter effect is impressed here on an optical fiber 120 by bending the fiber. Optical fiber 120 is arranged in closed loops 144 and 145 which overlap alternately in different loop planes 146 and 147 enclosing an angle of $180° - \xi$. Each loop 144 or 145 corresponds to a delay section of determined length. Instead of one loop, groups of loops comprising a plurality of loops can be provided to form a delay section. Advantageously, to position optical fiber 120, loops 144 can be placed in one loop plane 146, and loops 145 in the other loop plane 147, in opposite looping directions.

It is understood that the above-cited means to obtain the necessary double refraction and/or to connect the double-refraction delay sections can be used in combination. For example, a Solc fan filter can be obtained by applying the pinching forces in fanlike distributed directions of action to an extended optical fiber. It is possible also to connect delay sections to which the necessary double refraction is imparted by bending—the loops or bends of the individual delay sections being in a common plane—coupling sections obtained as described in reference to FIG. 4. A fiber-optics Solc fan filter with looped delay sections may also be produced by arranging the loops in fan- or star-shaped planes.

Figure 12:
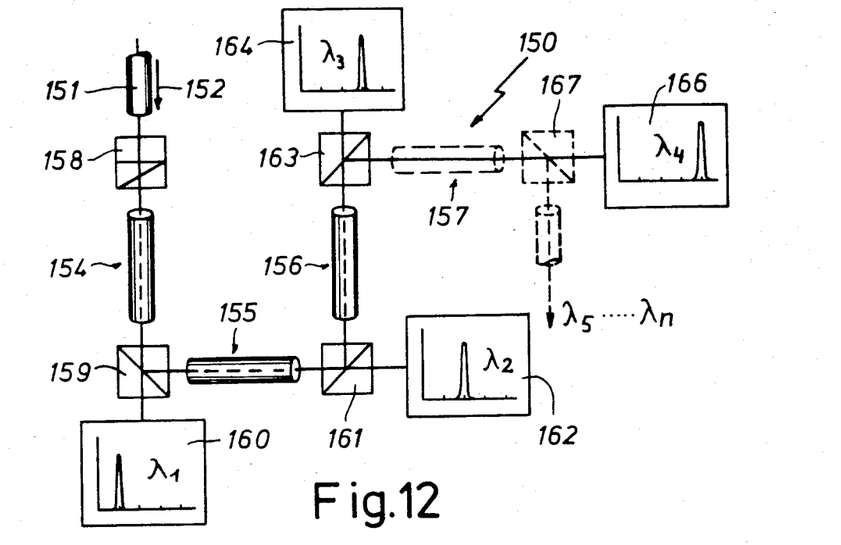
FIG. 12 shows diagrammatically a fiber-optics communications transmission arrangement comprising a plurality of transmission filters of the present invention.

FIG. 12 represents schematically a fiber-optics arrangement 150 consisting of optical-fiber transmission filters of the invention, which in particular may present the structure described in reference to FIG. 4 or FIGS. 9–11. Said arrangement provides for the decomposition into components practically without loss of a signal light beam which is guided by a single optical fiber 151 and comprises a plurality of partial light beams of different wavelength, which are assumed to be monochromatic within a narrow band width $\delta\lambda$. Arrangement 150 is usable, for example, in a fiber-optics communications transmission system to separate and process individually partial light beams of different wavelength used as carriers for different information and normally pulsed in a manner characteristic of the information concerned.

Figure 13:
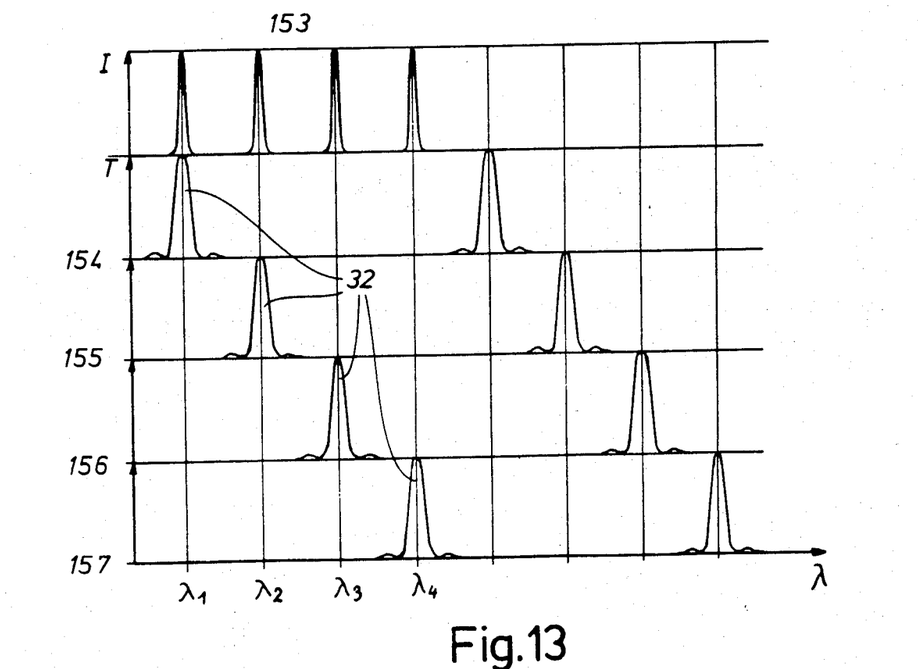
FIG. 13 shows the transmission curves of the filters of the arrangement represented in FIG. 12.

In the illustrated embodiment of FIG. 12, it is assumed for simplicity that the signal light beam 152 comprises four partial light beams whose spectral intensity distribution around central wavelengths $\lambda_1$, $\lambda_2$, $\lambda_3$, and $\lambda_4$ are represented by narrow-band intensity maxima 153 in the first family of curves of FIG. 13. It is assumed also that the partial light beams guided by an optical fiber 151 are fully polarized. Arrangement 150 contains four fiber-optics transmission filters 154–157 whose transmission behavior is adapted to the spectral distribution of the parallel light beams as apparent from FIG. 3, so that only one transmission maximum 32 (see FIG. 3) of filters 154–157 coincides with one of the signal light waves $\lambda_1 - \lambda_4$. The illustrated variation of the transmission curves related to filters 154–157, preferably in the same order, can be obtained by suitable selection and/or tuning of the double-refraction properties of the optical fibers.

The structure of a filter arrangement 150 as illustrated in FIG. 12, is set up so that signal light beam 152 containing all the partial light beams impinges first on filter 154 whose effective transmission maximum 36 is adjusted to wavelength $\lambda_1$. The linear polarization state of the light injected into first filter 154 necessary for the appropriate operation of said filter is obtained by the suitable adjustment of an optical phase compensator, for example a Soleil-Babinet compensator 158. The plane of polarization of the light issuing from compensator 158 and injected into the optical fiber of first filter 154, forms the reference plane for the directions in which the above-cited double-refraction properties are imparted to the optical fibe of filter 154 by lateral compression, bending, or the like. The output polarizer of first filter 154, comparable to the output polarizer 108 of FIG. 4, forms a polarizing prism which, for example in the extraordinary output path, deflects the partial light beam of wavelength $\lambda_1$, to which first filter 154 is tuned, to a first detector 160, and, in the ordinary output path, injects the residual partial light beams of wavelengths $\lambda_2$, $\lambda_3$, and $\lambda_4$ with a linear polarization state, into the optical fiber of second filter 155. The output polarizer of second filter 155 or the input polarizer of third filter 156 forms another two-output polarizing prism 161 which directs the partial light beam of wavelength $\lambda_2$ to another detector 162 and the residual partial light beams of wavelengths $\lambda_3$ and $\lambda_4$ to third filter 156. A third two-output polarizing prism 163 constituting the output polarizer of third filter 156, finally, over its extraordinary and ordinary output light paths, provides for the necessary spatial separation of the residual partial light beams of wavelengths $\lambda_3$ and $\lambda_4$ for the separate informations with detectors 164 and 166. A fourth filter 157, shown by broken lines in FIG. 12, is needed only when filters tuned to other wavelengths ($\lambda_5, \ldots \lambda_n$) must be connected in a similar way over an additional polarizing prism 167. Polarizing prisms appropriate to arrangement 150 are, for example, the Rochon prism, the Sénarmont prism, and the Wollaston prism.

A system adapted to the same application as the arrangement 150 of FIG. 12 can be obtained by introducing after optical fiber 151 guiding the total light beam a multiple beam splitter device to divide primary light beam 152 into a number of spatially separate light beams of approximately equal intensity, corresponding to the number of partial light beams of different wavelength. In this case a narrow-band transmission filter of the invention, adapted to the wavelength to be filtered, is provided in the path of each of said light beams.

It is to be understood that the above-described arrangements are simply illustrative of the application of the principles of this invention. Numerous other arrangements may be readily devised by those skilled in the art which embody the principles of the invention and fall within its spirit and scope.

I claim:

1. An optical transmission filter comprising at least one double-refraction element mounted between polarizers which determine characteristic polarization states, wherein the dimensions of the double-refraction element, viewed in the direction of a predetermined light path, are sufficient to obtain a phase delay of at least $2\pi$ between orthogonal polarization states for at least one wavelength of light injected along the direction of the light path, characterized in that the double-refraction element is a single-mode optical fiber whose double-refraction characteristics are sufficiently weak so that a $\lambda$ length within which the light beams propagating with orthogonal polarization states in the fiber are mutually delayed by $2\pi$, is at least 1 cm.

2. The transmission filter as in claim 1, characterized in that the single-mode fiber exhibits a linear double refraction, with the difference $\Delta n$ between indices of refraction of the light propagating in the fiber for the two orthogonal polarization states being at least $10^{-8}$.

3. A fiber-optics arrangement for communications transmission, comprising:

an optical fiber for guiding a signal light beam which, as carrier for different information signals, covers different wavelengths; and a number of optical filters separating and decoupling individual partial light beams;

characterized in that the outputs of the optical filters are coupled to beam splitting means for dividing a primary light beam containing the partial light beams into a number of spatially separate light beams of equal intensity corresponding to the number of partial light beams, and in that a narrow-band transmission filter adapted to the different wavelengths to be filtered is arranged in each of said spatially separate light beams, wherein each of said narrow-band transmission filters comprises at least one double-refraction element mounted between polarizers which determine characteristic polarization states, wherein the dimensions of the double-refraction element, viewed in the direction of a predetermined light path, are sufficient to obtain a phase delay of at least $2\pi$ between orthogonal polarization states for at least one wavelength of light injected along the direction of the light path, characterized in that the double-refraction element is a single-mode optical fiber whose double-refraction characteristics are sufficiently weak so that a $\lambda$ length within which the light beams propagating with orthogonal polarization states in the fiber are mutually delayed by $2\pi$, is at least 1 cm.

4. A fiber-optics arrangement for selecting monochromatic light beam components of different wavelength $\lambda_1, \lambda_2, \lambda_3, \ldots \lambda_n$ from a light beam containing a plurality of such components, using a fiber-optics transmission filter comprising at least one double-refraction element mounted between polarizers which determine characteristic polarization states, wherein the dimensions of the double-refraction element, viewed in the direction of a predetermined light path, are sufficient to obtain a phase delay of at least $2\pi$ between orthogonal polarization states for at least one wavelength of light injected along the direction of the light path, characterized in that the double-refraction element is a single-mode optical fiber whose double-refraction characteristics are sufficiently weak so that a $\lambda$ length within which the light beams propagating with orthogonal polarization states in the fiber are mutually delayed by $2\pi$, is at least 1 cm, and further characterized in that at least one said filter is provided, into which a light beam containing at least some of the monochromatic light beam components is directed, wherein the output polarizer of said filter comprises a two-output polarizing prism through which an output light path of a partial light beam of the wavelength to which the filter is tuned, is directed to a detector which injects a reduced partial beam over a second output light path of the polarizing prism also constituting the input polarizer of a second filter into the fiber, and wherein the output polarizer of said second filter is a second two-output polarizing prism, the output light beam of the second polarizing prism containing only light to which the second filter is adjusted, being directed to a detector, and the other output light beam being also directed to a detector in a case where is still contains exclusively monochromatic light, and a third filter connected to the fiber to separate a partial light beam of specific wavelength in a case where the output light beam does not contain exclusively monochromatic light.

5. The fiber-optics arrangement as in claim 3 or 4, characterized in that the fiber-optics transmission filters utilized to filter the individual partial light beams and in which the wavelengths to be filtered are used in the same order, the wavelength interval between the partial light beams being larger than the bandwidth of the filter transmission maxima, and the spectral range over which the partial light beams are distributed, is narrower, by at least the bandwidth of the transmission maxima of the filters than the shortest wavelength interval $\Delta\lambda_k$ between two transmission maxima.

6. The transmission filter as in claim 1, 2, 3 or 4, characterized in that a linear double refraction is impressed on the optical fiber by pinching at least one portion of said fiber.

7. The transmission filter as in claim 6, characterized in that the optical fiber is placed between polarizers marking the same polarization state and pinched at a number of points m along a portion of its length, the directions in which the pinching forces are applied being distributed in a fanlike manner about the fiber axis, and the angular distances $\omega_j$ of these directions of application from the plane of polarization of the polarization states impressed on the fiber being given by the equation:

$$\omega_j = (\xi/2) + (j-1)\xi$$

where $j = 1, 2, \ldots m$ (an integer) and $\xi = (\pi)/(2m)$.

8. The transmission filter as in claim 6, characterized in that the optical fiber is arranged between crossed polarizers and pinched at a number m of points distributed along a portion of its length, the directions of application $\omega_j$ of the pinching forces alternating relative to the plane of polarization of the impressed polarization states when viewed in the longitudinal direction of the fiber, according to the equation:

$$\omega_j = (-1)^{j+1}(\xi/2)$$

where $\xi = \pi/2m$ and $j = 1, 2, \ldots m$ (integers).

9. The transmission filter as in claim 1, 2, 3, or 4, characterized in that said optical fiber is bent to impress double refraction.

10. The transmission filter as in claim 9, characterized in that the optical fiber is bent into loops.

11. The transmission filter as in claim 9, characterized in that sections of an optical fiber material containing no inherent double refraction arranged between parallel polarizers are formed into loops overlapping in different planes intersecting along a central axis and whose angular position relative to the direction of polarization of the incident light is given by the equation:

$$\omega_j = (\xi/2) + (j-1)\epsilon$$

where $\epsilon = \pi/2m$ and $j = 1, 2, \ldots m$ (integer), the fiber being placed in the separate planes with the same number of loops and the same diameters.

12. The transmission filter as in claim 9, comprising an optical fiber extending between crossed polarizers and set up in abutting loops, characterized in that the loops or groups of equal numbers of loops abutting in alternate looping directions, are placed in different planes which are symmetrical with respect to the planes of polarization of the polarization states impressed on the fiber, and enclose an angle $\pi - \xi$, where $\xi = \pi/2m$ when m is the number of loops or groups of loops present in one or the other plane.

13. The transmission filter as in claim 12, wherein the loops are of equal diameter.

14. The transmission filter as in claim 1, 2, 3 or 4, characterized in that the optical fiber exhibits a circular or an elliptical double refraction induced by torsion about its longitudinal axis.

15. The transmission filter as in claim 14, characterized in that the optical fiber exhibits a linear inherent double refraction $\beta$ and is retained by supports distributed along its length, and further wherein the optical fiber is divided into a number of delay sections and a number of coupling sections extending between pairs of delay sections, wherein the delay sections arranged between the coupling sections having the same length which is equal, for a determined wavelength $\lambda_k$ of the incident light, to $(p+1)$ times the $\lambda$ length $l_{\lambda k}$ to produce a $2\pi$ phase shift in the orthogonal polarization states, the length of a first delay section adjacent to a first coupling section being $p + \frac{1}{4}l_{\lambda k}$, and the length of a delay section between the last coupling section and an output polarizer being $p + \frac{3}{4}l_{\lambda k}$, wherein the coupling sections are twisted in their transverse median plane relative to fixed ends thereof with a degree of torsion $\tau$ given by the equation:

$$\tau = \frac{\beta}{(g-2)} \cdot \tan\left(\frac{\xi}{4}\right)$$

where $\xi = \pi/2m$ and g is a constant factor ranging between 0.13 and 0.16 for quartz fibers, and in that the length $l_{\eta k}$ of the coupling section is determined according to the equation:

$$l_{\eta k} \approx \frac{l_{\lambda k}}{\sqrt{\frac{(g-2)^2 \tau^2}{\beta^2} + 1}}$$

16. An optical transmission filter comprising:
an input polarizer for receiving light along a predetermined light path;
an output polarizer; and
a single-mode optical fiber mounted between said input and output polarizer, comprising at least one delay section for producing a linear double refraction and at least one section which is twisted under a torsional force to produce an elliptical double refraction.

17. An optical transmission filter comprisng:
an input polarizer for receiving light along a predetermined light path;
an output polarizer; and
a single-mode optical fiber mounted between the input and output polarizers comprising:
an input linear double refraction delay section for receiving light from the input polarizer;
an output linear double refraction delay section for sending light to the output polarizer;
an intermediate linear double refraction delay section located between the input and output delay sections; and
a plurality of coupling sections for coupling the input and output delay sections to the intermediate delay section, wherein the coupling sections are twisted under a torsional force to produce an elliptical double refraction.

18. A filter as in claim 16 or 17, wherein each twisted section of the optical fiber includes a first portion twisted to produce a right elliptical double refraction and a second portion twisted to produce a left elliptical double refraction.

* * * * *